United States Patent
Bent et al.

[15] 3,682,971
[45] Aug. 8, 1972

[54] METAL COMPLEXES

[72] Inventors: Keith Joseph Bent; John Michael Cox, both of Bracknell, England

[73] Assignee: Imperial Chemical Industries Limited, London, England

[22] Filed: Oct. 17, 1969

[21] Appl. No.: 867,408

[30] Foreign Application Priority Data

Oct. 29, 1968 Great Britain............51273/68

[52] U.S. Cl..............................260/343.2 R, 424/279
[51] Int. Cl. .................................................C07d 7/20
[58] Field of Search............................260/343.2 R

[56] References Cited

UNITED STATES PATENTS

| | | |
|---|---|---|
| 2,427,579 | 9/1947 | Stahmann et al........260/343.2 |
| 2,895,964 | 7/1959 | Emerson et al.........260/343.2 |

*Primary Examiner*—John M. Ford
*Attorney*—Cushman, Darby & Cushman

[57] ABSTRACT

Metal complexes and salts of the compound 2,3,3a,9b-tetrahydro-6-hydroxy-7,8-dimethoxy-2-n-propyl-5H-furo [3,2-c] [2] possess anti-fungal properties.

3 Claims, No Drawings

METAL COMPLEXES

This invention relates to new chemical compounds and more particularly it relates to new heterocyclic compounds which possess anti-fungal properties.

According to the invention we provide metal complexes and salts of the heterocyclic compound 2,3,3a,9b-tetrahydro-6-hydroxy-7,8-dimethoxy-2-n-propyl-5H-furo [3,2-c][2]-benzopyran-5-one, having the formula:

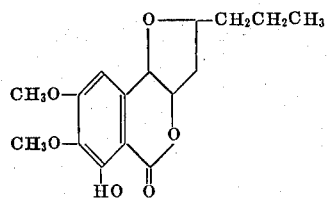

This compound is hereinafter described as I.C.I. Compound no. 209,946 and references in this specification to "the heterocyclic compound" are to be taken as references thereto.

The metal complexes and salts of this invention may be complexes with metals, such as for example iron, nickel, cobalt, copper, manganese and chromium. Salts of the heterocyclic compound may comprise, for example, those of the alkali and alkaline earth metals, for example sodium, potassium and calcium.

According to a further feature of the invention we provide a process of the preparation of metal complexes and salts of I.C.I. Compound no. 209,946 which comprises cultivation of the organism *Helminthosporium monoceras* in a nutrient medium containing an assimilable source of carbon and an assimilable source of nitrogen, followed by isolation of the product from the medium and its conversion to a metal complex or salt.

The fermentation process may be carried out by means of surface culture or it may be carried out in deep culture in a stirred aerated medium under batchwise or continuous conditions.

As a suitable active strain of the organism there may be mentioned, for example, *Helminthosporium monoceras* which is available to the public from the Commonwealth Mycological Institute located at Kew, England where it is identified as CMI 125855. The fermentation may be carried out at a temperature of about 18°–38°C. and preferably at a temperature of about 20°–30C. Growth of the organism is allowed to continue for a period of about 3–15 days under stirred aerated culture conditions or for a period of about 6–20 days, preferably about 13 days, under surface culture conditions before the desired product is isolated from the culture medium.

A suitable assimilable source of carbon is, for example, a polyhydric alcohol, for example sucrose, glucose or glycerol, or a mixture of two or more such substances. The carbon source is generally present in the medium within the range of about 0.1–30 percent by weight and preferably within the range of about 5–15 percent by weight. A suitable assimilable source of nitrogen may be an inorganic source or an organic source. The nitrogen may conveniently be provided initially in the form of, for example, an alkali metal or alkaline earth metal nitrate, or an ammonium salt of an inorganic acid or an organic acid, for example sodium, potassium, calcium or ammonium nitrate or ammonium tartrate, ammonium sulphate or ammonium phosphate. It may also be provided in the form of an amino-acid, for example glycine, a seed meal, for example, cottonseed meal, or corn steep liquor, peptone, urea, a yeast extract or a meat extract. It is to be understood that the assimilable source of nitrogen may be a mixture of two or more of the above mentioned substances. The nitrogen source is generally present in the medium in an amount such that there is present between about 0.001 percent and about 1.0 percent of elementary nitrogen in the medium. The medium usually contains smaller quantities of essential elements such as phosphorus (for example as diammonium hydrogen phosphate), magnesium (for example as magnesium carbonate), sulphur (for example as a sulphate) and potassium (for example as potassium carbonate) and minute quantities of so-called trace elements such as iron, manganese, zinc, molybdenum and copper.

The desired compound is present in the culture medium and it may be isolated there from by filtration followed by extraction with a suitable organic solvent, for example ethyl acetate, butyl acetate or chloroform. The product may be purified by chromatography, for example, by chromatography on a silica gel column using mixtures of benzene and chloroform as eluant, or by preparative thin-layer chromatography.

The metal complexes and salts of the heterocyclic compound may be conveniently prepared in solution by adding a solution, e.g., a methanolic solution, of the compound to a solution, preferably an aqueous solution, of the metal salt, preferably using equimolar proportions.

As stated above, the heterocyclic compound metal complexes and salts of the invention possess anti-fungal properties, and they may be used for the treatment of fungal infestations of plants. In particular, they are active against a variety of fungal diseases of plants including, for example, the following specific diseases:

*Sphaerotheca fuliginea* (powdery mildew) on cucumber

*Erysiphe graminis* (powdery mildew) on wheat and barley

*Sphaerotheca pannosa* (mildew) on roses

*Diplocarpon rosae* (black spot) on roses

*Podosphaera leucotricha* (*powdery mildew*) *on apple*

*Uncinula necator* (powdery mildew) on vine

*Piricularia oryzae* (blast) on rice

*Plasmopara viticola* (*downy mildew*) *on vine*

*Fusarium culmorum* (foot-rot) on wheat

Phytophthora infestans (late blight) on tomato

A particularly useful feature of the activity of the metal complexes and salts of the invention is their systemic effect, that is to say, their ability to move throughout a plant to reach any part thereof and to combat any fungal infection thereon; it is possible with their use, therefore, to produce a composition which has valuable systemic fungicidal activity.

According to a further feature of the invention we provide fungicidal compositions which comprise at least one of the heterocyclic compound metal complexes or salts of the invention in association with a diluent or carrier therefor.

The metal complexes and salts, and compositions containing them are useful for agricultural or horticultural purposes and the complex or salt, or type of composition, used in any instance will depend upon the particular purpose for which it is to be used.

The compositions of the invention may be in the form of dusting powders or granules wherein the active ingredient is mixed with a solid diluent or carrier. Suitable solid diluents or carriers may be, for example, kaolin, pumice, bentonite, kieselguhr, dolomite, calcium carbonate, talc, powdered magnesia, Fuller's earth, gypsum, Hewitt's earth, diatomaceous earth and China clay. Compositions suitable for dressing seeds may, for example, also contain an agent which will assist the adhesion of the composition to the seed, for example, a mineral oil, or a vegetable oil such as castor oil. Alternatively, solid compositions may be in the form of dispersible powders or gains which contain in addition to the active ingredient, a wetting agent to facilitate the dispersion of the powder or grains in liquids. Such powders or grains may include fillers, suspending agents and the like.

The compositions may also be in the form of liquid preparations to be used, for example, as sprays which are generally aqueous dispersions or emulsions containing the active ingredient in the presence of one or more wetting agents, dispersing agents, emulsifying agents or suspending agents. Wetting agents, dispersing agents and emulsifying agents may be of the cationic, anionic or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butylnaphthalenesulphonate, and a mixture of the sodium salts of diisopropyl- and triisopropylnaphthalenesulphonic acids. Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example, gum acacia and gum tragacanth.

The aqueous dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes, trimethylbenzene, methylchloroform and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, additives for improving the distribution, adhesive power and resistance to rain on treated surfaces, the different compositions can be better adapted for the various uses for which they are intended.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and, after such storage, to be capable of dilution with water in order to form aqueous preparations which remain homogenous for a sufficient time to enable them to be applied by conventional spray equipment. The concentrates may contain from 10–85 percent by weight of the active ingredient or ingredients and generally from 25–60 percent by weight of the active ingredient or ingredients. When diluted to form aqueous preparations, such preparations may contain varying amounts of the active ingredient or ingredients depending upon the purpose for which they are to be used. For agricultural or horticultural purposes, an aqueous preparation containing between 0.0001 percent and 1.0 percent and preferably between 0.001 percent and 0.1 percent, by weight of active ingredient or ingredients may be used.

The compositions of the invention may be stabilized by the incorporation therein of stabilizing agents, for example, epoxides, for example, epichlorohydrin.

It is to be understood that the fungicidal compositions of this invention may comprise, in addition to the heterocyclic compound metal complex or salt, one or more other compounds having biological activity. In particular, the heterocyclic compound metal complexes and salts may be formulated by admixing them with fertilizers. A preferred composition of this type comprises granules of fertilizer material incorporating, for example coated with, the heterocyclic compound metal complex or salt. The fertilizer material may, for example, comprise nitrogen, or phosphate-containing substances.

According to a further feature of the invention, therefore, we provide a fertilizer comprising the heterocylic compound metal complex or salt as hereinbefore defined, together with at least one agent of fertilizing utility.

In use, the heterocyclic compound metal complexes and salts, or compositions containing them, may be applied in a number of ways. Thus their application can suitably be directly onto the foliage of the plant or to infected areas thereof; alternatively the soil surrounding the plant, or soil in which seeds or plants are to be sown or planted can be treated, for example by drenching with the heterocyclic compound metal complex or salt, or with compositions containing them. Alternatively, if desired, the seeds themselves can be treated directly, for example the seeds may be dressed with heterocyclic compound metal complex or salt, or with compositions containing the complex or salt.

According to a further feature of the invention, therefore, we provide a method of combating undesired fungal infections in plants which comprises applying to a plant, or to seeds thereof, or to the locus of the plant, the heterocyclic compound metal complexes or salts or a composition containing said complex or salt.

According to yet a further feature of the invention we provide a method for treating agricultural soil which comprises applying to said soil the heterocyclic compound metal complex or salt or a composition containing said complex or salt.

The invention is illustrated but not limited by the following examples:

EXAMPLE 1

This example illustrates the preparation of the heterocyclic compound.

A culture medium is made up as follows:

| | |
|---|---|
| D-tartaric acid | 2.66 g. |
| ammonium tartrate | 2.66 g. |
| diammonium hydrogen phosphate | 0.4 g. |
| potassium carbonate | 0.4 g. |
| magnesium carbonate | 0.27 g. |
| ammonium sulphate | 0.16 g. |
| ferrous sulphate heptahydrate | 0.042 g. |
| zinc sulphate | 0.042 g. |
| yeast extract ("Oxoid" brand; "Oxoid" is a registered trade mark) | 1.0 g. |
| "Cerulose" ("Cerulose" is a registered trade mark) | 50.0 g. |
| distilled water to | 1 liter |

The pH of the medium is adjusted to between 5.3 and 5.7, with either potassium hydroxide or hydrochloric acid as required, and is then sterilized by heating in an autoclave.

The organism *Helminthosporium monoceras*, which is available to the public from the Commonwealth Mycological Institute located at Kew, England, where it is identified as CMI 125,855, is grown at a temperature of 25°C. in surface culture in Thomsen bottles each containing 1 liter of the above medium, and the fermentation is harvested after 13 days. The culture filtrate (80 liters) is extracted three times with ethyl acetate, the first extract using 16 liters of solvent and the two further extracts using 8 liters of solvent each time. The combined extracts are dried and evaporated to dryness under reduced pressure, and the combined residues from two such fermentations (17.3 g.) are dissolved in acetone. Silica gel (50 ml.) is added to the solution and the acetone is removed by evaporation so that the residue is absorbed onto the silica gel. The silica gel together with the absorbed residue is placed on the top of a column of 850 ml. of silica gel made up in benzene, and the column is eluted successively with benzene (5 liters), a 1:19 (v/v) mixture of chloroform and benzene (1 liter), a 1:9 (v/v) mixture of chloroform and benzene (1 liter), a 1:5 (v/v) mixture of chloroform and benzene (1 liter) and a 3:7 (v/v) mixture of chloroform and benzene (3 liters). The material thus eluted (2.3 g.) is discarded and the column is further eluted with a 1:1 (v/v) mixture of chloroform and benzene (7 liters). The eluant is evaporated to dryness and the residue (10.6 g.) is crystallized from a mixture of ether and petroleum ether (b.p. 60°–80°C.). There is thus obtained I.C.I. Compound no. 209,946 as prisms, m.p. 63°–65°C.; $[\alpha]_D^{24} = +53°$ ($c = 0.85$ in methanol); $\nu$max (paraffin oil mull): 1,673 (strong), 1,619 (medium), 1,584 (weak) and 1,515 (medium and broad) cm.$^{-1}$; $\nu$max (in methanol): 221 ($\epsilon = 24,600$), 274 ($\epsilon = 11,900$) and 306 ($\epsilon = 4,170$) m$\mu$. $\tau$(CCl$_4$): minus 1.23 (1H, singlet); 3.52 (1H, singlet); 5.03 (1H, multiplet); 5.61 (1H, doublet, 3.5 c.p.s.); 6.11 (3H, singlet); 6.23 (3H, singlet); ca. 6.1 (1H, multiplet); 7.2–9.4 (9H, multiplets). (Found: C, 62.1; H, 6.5%; M, 308.1259. $C_{16}H_{20}O_6$ requires C, 62.3; H, 6.5%; M, 308.1260).

EXAMPLE 2

This example illustrates a further method for making the heterocyclic compound.

The organism described in Example 1 is grown in stirred deep culture in 5 liters of the medium described in Example 1 for 7 days, the culture being aerated by passage of a current of air at a rate of 3 liters per minute. The fermentation is harvested and the culture filtrate is extracted with ethyl acetate in a similar manner to that described in Example 1. There is thus obtained a residue (260 mg.) from which I.C.I. Compound 209,946 (60 mg.) is isolated by column chromatography similar to that described in Example 1, followed by preparative thin layer chromatography on silica gel plates using a 1:19 (v/v) mixture of methanol and chloroform as developing solvent.

EXAMPLE 3

This example illustrates another procedure for preparing the heterocyclic compound.

The organism described in example 1 is grown for 15 days in stirred deep culture in 80 liters of the medium described in Example 1, except that the initial pH of the medium is 5.9, of the culture being aerated by passage of a current of air at a rate of 40 liters per minute. The fermentation is harvested, the mycelium being separated from the filtrate using "Hyflo Supercel" as a filter-aid (200 g. per 10 liters of filtrate) on a rotary filter, and the culture filtrate (60 liters) is extracted with butyl acetate in a similar manner to that described in Example 1. There is thus obtained a residue (17.2 g.) from which I.C.I. Compound 209,946 (6.7 g.) is isolated by column chromatography similar to that described in Example 1. The compound isolated in this manner is in the form of plates, m.p. 58°–59°C., as opposed to prisms, m.p. 63°–65°C., but analytical techniques confirm that the chemical composition of the prisms and plates is identical.

EXAMPLE 4

This example illustrates a method of preparation of metal complexes and salts, of the heterocyclic compound.

In each case a solution of the heterocyclic compound (I.C.I. Compound 209,946; 125 mg.) in methanol (20 ml.) was added to a solution of an inorganic metal salt in water (480 ml.). The mixture was stirred until a clear solution was obtained. Each solution comprised 250 p.p.m. with respect to the heterocyclic compound (I.C.I. Compound no. 209,946). In the table below the various salts used are listed together with the amount dissolved in water.

| Complex or Salt No. | Salt Used | Amount in milligrams |
|---|---|---|
| 1 | FeCl$_3$ | 66 |

| | | |
|---|---|---|
| 2 | NiSO$_4$·6H$_2$O | 107 |
| 3 | CuSO$_4$·5H$_2$O | 101 |
| 4 | MnBr$_2$·4H$_2$O | 116 |
| 5 | Cr$_2$(SO$_4$)$_3$·15H$_2$O | 269 |
| 6 | CoCl$_2$·6H$_2$O | 101 |
| | | 16.2 |
| 7 | NaOH | (i.e. 0.41 milliliters of a normal solution). |

EXAMPLE 5

This example illustrates the fungicidal activity of the metal complexes and salts of the invention.

Compositions according to the invention were made up in the following manner and tested in different ways against various foliar-born fungal diseases. The procedure adopted for each test is described below.

An aqueous solution or suspension containing 250, 125, or 50 parts per million (p.p.m.) of the compound under test and suitable either for drenching the soil surrounding growing plants, or for spraying onto the leaves of cucumber, vine or apple plants is obtained by adding water to a solution of the compound (100, 50, or 20 mg.) in acetone (1 ml.) until the total volume of the mixture is 400 ml. An aqueous solution or suspension suitable for spraying onto the leaves of wheat, barley or rice plants is prepared similarly, but instead of water, a 0.1 percent volume/volume aqueous solution of the polyoxyethylene-sorbitan monolaurate wetting agent, "Tween" 20, is used ("Tween" is a Trademark).

A. Spray-applied Protectant Test (P.S.A.)

A suspension or solution containing the active compound was sprayed directly onto the leaves of plants, a wetting agent being used when the plant was wheat, barley or rice. After 24 hours the plant was inoculated with the fungus under test and after a suitable period of time (time interval A—see table below) depending upon the particular plant and fungus, the extent of the infection was assessed visually.

B. Drench-applied Protectant Test (P.R.D.)

A suspension or solution containing the active compound was applied to the soil surrounding the plant under test, and 48 hours later the plant was inoculated with the fungus. The extent of infection was assessed visually after a period of time (time interval B—see table below) depending upon the plant and the fungus.

The results of the tests are set out in the table below the amount of disease being expressed as a grading giving the percentage amount of disease:

| Grading | Percentage amount of disease |
|---|---|
| 0 | 61 to 100 |
| 1 | 26 to 60 |
| 2 | 6 to 25 |
| 3 | 0 to 5 |

C. Spray-applied Eradicant Test (E.S.A.)

The plants were inoculated with the fungus under test, and 24 hours later the liquid preparation containing 250, 125 or 50 p.p.m. of the active compound, depending upon the disease, was sprayed onto the leaves of the plants as described under A above. After a further period of time (time interval C—see table below), again depending upon the particular plant and fungus, the extent of infection was assessed visually.

Concentration of compound, p.p.m.

| Compound No. of Ex. 4 | Puccinia recondita (rust) 250 | | | Phytophthora infestans (late blight) 250 | | | Sphaerotheca fuliginea (powdery mildew) 250 | | | Erysiphe graminis (powdery mildew) (W) 50 | | | Erysiphe graminis (powdery mildew) (B) 50 | | | Podosphaera leucotricha (powdery mildew) 50 | | | Uncinula necator (powdery mildew) 125 | | | Plasmopara viticola (downy mildew) 250 | | | Piricularia oryzae (blast) 250 | | |
|---|---|---|---|---|---|---|---|---|---|---|---|---|---|---|---|---|---|---|---|---|---|---|---|---|---|---|---|
| | PSA | PRD | ESA | PSA | PRD | ESA | PSA | PRD | ESA | PSA | PRD | ESA | PSA | PRD | ESA | PSA | PRD | ESA | PSA | PRD | ESA | PSA | PRD | ESA | PSA | PRD | ESA |
| 1 | 0 | 0 | 0 | 3 | 3 | 3 | 3 | 3 | 3 | 3 | 0 | 0 | 0 | 0 | 3 | 3 | 2 | 3 | 3 | 3 | 3 | 0 | 0 | 0 | 0 | 0 | — |
| 2 | 1 | 1 | 1 | 1 | 3 | 0 | 3 | 3 | 3 | 0 | 2 | 1 | 1 | 3 | 1 | 1 | 2 | 3 | 3 | 3 | 1 | 2 | 2 | — | 1 | 1 | — |
| 3 | 0 | 0 | 0 | 0 | 3 | 1 | 3 | 3 | 3 | 0 | 0 | 1 | 2 | 3 | 1 | 1 | 3 | 3 | 3 | 3 | 3 | 2 | 3 | — | 1 | 0 | — |
| 4 | 0 | 0 | 0 | 3 | 3 | 0 | 3 | 3 | 3 | 0 | 0 | 0 | 0 | 3 | 2 | 0 | 2 | 2 | 3 | 3 | 3 | 0 | 0 | — | 0 | 0 | — |
| 5 | 0 | 0 | 0 | 3 | 3 | 0 | 3 | 3 | 3 | 0 | 0 | 2 | 0 | 3 | 2 | 2 | 3 | 3 | 3 | 3 | 3 | 3 | 0 | — | 0 | 0 | — |
| 6 | 0 | 0 | 0 | 2 | 1 | 1 | 3 | 3 | 3 | 0 | 0 | 6 | 2 | 1 | 0 | 0 | 1 | 3 | 1 | 3 | 3 | 0 | 3 | — | 0 | 0 | — |

NOTE.—W = Wheat. B = Barley.

| Disease and Plant | Time interval A and B (days) | Time interval C (days) |
| --- | --- | --- |
| Puccinia recondita (wheat) | 10 | — |
| Phytophthora infestans (tomato) | 3 | — |
| Sphaerotheca fuliginea (cucumber) | 7 | 6 |
| Erysiphe graminis (wheat) | 7 | 6 |
| Erysiphe graminis (barley) | 7 | 6 |
| Podosphaera leucotricha (apple) | 10 | 9 |
| Uncinula necator (vine) | 10 | 9 |
| Plasmopara viticola (vine) | 7 | — |
| Piricularia oryzae (rice) | 7 | 6 |
| Venturia inaequalis (apple) | 21 | 20 |

We claim:

1. A compound selected from the group consisting of the complexes of a metal of the transition series of the Periodic Table with 2,3,3a,9b-tetrahydro-6-hydroxy-7,8-dimethoxy-2-n-propyl-5H-furo [3,2-c] [2]-benzopyran-5-one.

2. A compound according to claim 1 selected from the group consisting of iron, nickel, cobalt, copper, chromium and manganese complexes of 2,3,3a,9b-tetrahydro-6-hydroxy-7,8-dimethoxy-2-n-propyl-5H-furo [3,2-c] [2]-benzopyran-5-one.

3. A metal complex according to claim 2 and comprising said 2,3,3a,9b-tetrahydro-6-hydroxy-7,8-dimethoxy-2-n-propyl-5H-furo [3,2 - c] [2] - benzopyran-5-one and an inorganic metal salt selected from the group consisting of $FeCl_3$; $NiSO_4 \cdot 6H_2O$; $CuSO_4 \cdot 5H_2O$; $MnBr_2 \cdot 4H_2O$; $Cr_2(SO_4)_3 \cdot 15H_2O$; and $CoCl_2 \cdot 6H_2O$.

* * * * *